United States Patent [19]

Vroom

[11] Patent Number: 4,657,233
[45] Date of Patent: Apr. 14, 1987

[54] ASSIST APPARATUS FOR RAMPS

[76] Inventor: James W. Vroom, 6945 E. Cheney, Paradise Valley, Ariz. 85253

[21] Appl. No.: 725,260

[22] Filed: Apr. 19, 1985

[51] Int. Cl.⁴ .............................................. B65G 67/00
[52] U.S. Cl. ...................................... 267/155; 16/306; 296/61; 414/537
[58] Field of Search ................ 414/537; 14/69.5, 71.1, 14/71.3; 16/295, 306; 296/61; 267/58, 155

[56] References Cited

U.S. PATENT DOCUMENTS

| | | | |
|---|---|---|---|
| 385,312 | 6/1888 | Kochsmeier | 16/295 |
| 467,472 | 1/1892 | Redlinger | 16/295 |
| 1,956,877 | 5/1934 | Prouty et al. | 267/58 X |
| 2,023,909 | 12/1935 | Wread | 296/61 X |
| 2,527,653 | 10/1950 | Pierce | 14/71.1 |
| 2,557,048 | 6/1951 | Haase | 16/295 X |
| 2,559,007 | 7/1951 | Cliffe | 14/71.1 X |
| 2,867,345 | 1/1959 | Bellek | 16/295 X |
| 2,932,057 | 4/1960 | Pemberton | 267/58 X |
| 3,334,368 | 8/1967 | McIntosh et al. | 14/71.3 |
| 3,834,565 | 9/1974 | Goodman, Jr. et al. | 296/61 X |
| 4,065,824 | 1/1978 | Ellis et al. | 14/71.3 |
| 4,084,713 | 4/1978 | Rohrs et al. | 414/537 |
| 4,127,202 | 11/1978 | Jennings et al. | 414/537 |

FOREIGN PATENT DOCUMENTS 454886  10/1936  United Kingdom .................. 296/61

Primary Examiner—Robert J. Spar
Assistant Examiner—Stuart J. Millman
Attorney, Agent, or Firm—Cahill, Sutton & Thomas

[57] ABSTRACT

A coil spring, mounted within a cylinder and axially coincident with the pivot axis between a trailer and a ramp pivotally attached thereto, exerts a force angularly proportional to angular deviation of the ramp from its upright position to reduce the apparent weight of the ramp during manual repositioning of the ramp.

6 Claims, 8 Drawing Figures

U.S. Patent  Apr. 14, 1987  Sheet 1 of 2  4,657,233
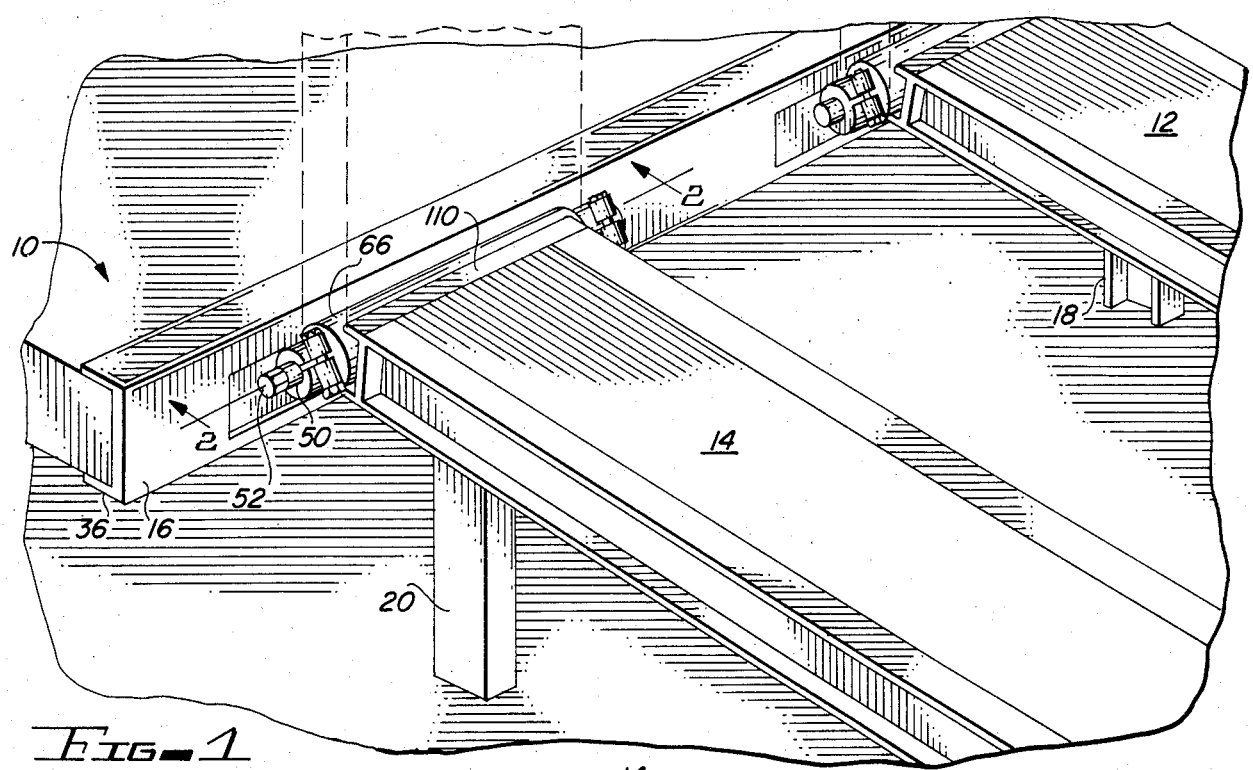
Fig-1
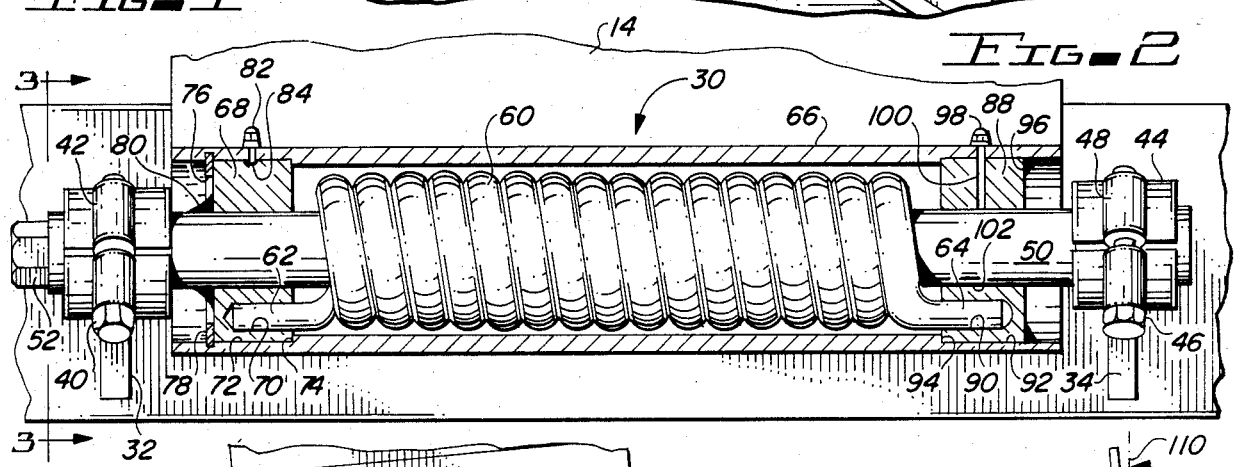
Fig-2
Fig-3
Fig-4

ASSIST APPARATUS FOR RAMPS

The present invention relates to spring assist apparatus and, more particularly, to apparatus for assisting manual repositioning of trailer ramps.

Trailers used for the purpose of transporting heavy duty mobile equipment to a work site generally require ramps for loading and unloading the equipment. Because of the weight of the equipment, the ramps must be relatively robust and they are therefore heavy. Moreover, the ramps are generally relatively long to permit a relatively shallow incline. The combination of length and weight constraints placed upon the ramp render them relatively difficult to manipulate by workmen and injuries in the nature of pulled muscles and dislocated joints are common. Usually, two individual ramps, positionally coincident with the tracks of the vehicle being loaded, are used in place of a single ramp to minimize both the weight and costs thereof.

The problems attendant trailer ramps are known and various solutions have been proposed. U.S. Pat. No. 3,834,565 is directed to a hydraulic system for providing a source of power to raise and lower a trailer attached ramp. Such a system is useable only if a source of hydraulic fluid under pressure is available from the trailer itself or from the draft vehicle.

Torsional springs have been used to assist pivotal movement of various bridging elements. For example, U.S. Pat. No. 4,084,713 describes a lightweight, articulated ramp for use in loading a wheel chair within a van and having a spring incorporated therein. U.S. Pat. No. 4,065,824 illustrates a coil spring for exerting a force to articulate a lip pivotally attached to a bridge plate upon pivotal movement of the bridge plate. A pair of coil springs are employed to balance a combined gate and bridge apparatus to permit accurate control in locating the free end of the bridge, as described in U.S. Pat. No. 2,527,653.

A coil spring described in U.S. Pat. No. 2,557,048 is employed to maintain the lid of a box in an open state after the lid is angularly reoriented to an over center position. As discussed in U.S. Pat. No. 2,867,345, the cover of an electrical outlet is maintained in an open or closed position by a coil spring upon lateral repositioning of the cover when in the open position.

In the present invention, the spring assist apparatus alleviates some of the actual weight of a manually positioned trailer ramp for heavy duty vehicles as a function of the angle of the ramp from vertical. A coil spring, which may be preloaded, is housed within and exerts a rotational force upon a cylinder secured to one end of the ramp through attachment with one end of the coil spring. A shaft extending through the coil spring is attached to the other end of the coil spring and the shaft is rigidly secured to and supported by a trailer. Thereby, the coil spring resists pivotal movement of the ramp about the shaft as a function of the pivot angle of the ramp to reduce the apparent weight of the ramp and reduce the work load attendant repositioning of the ramp between the at rest and in use positions.

It is therefore a primary object of the present invention to provide a spring assist mechanism for reducing the apparent weight of trailer attached ramps.

Another object of the present invention is to provide apparatus for relieving the hazards to an operator attendant loading and unloading trailer transported wheeled vehicles.

Still another object of the present invention is to provide a spring assist mechanism for use with trailer attached ramps which incorporates bearings to reduce the friction attendant pivotal movement of the ramps.

Yet another object of the present invention is to provide a housing protective of a spring and incorporated as part of the operative elements of a spring assist mechanism located at the pivoting junction between a trailer and an attached ramp.

A further object of the present invention is to provide a preloadable spring assist mechanism for reducing the apparent weight of trailer attached ramps A still further object of the present invention is to provide a spring assist mechanism for a trailer attached ramp that alleviates the apparent weight of the ramp both fore and aft of an upright position of the ramp.

A yet further object of the present invention is to provide a spring assist mechanism for ramps useable with both conventional and beaver tail trailers.

These and other objects of the invention will become apparent to those skilled in the art as the description thereof proceeds.

The present invention will be described in detail and with greater specificity in reference to the following drawings, in which:

FIG. 1 illustrates the attachment of a pair of ramps to the end of a trailer;

FIG. 2 is a cross-sectional view taken along lines 2—2, as shown in FIG. 1;

FIG. 3 is an end view taken along lines 3—3, as shown in FIG. 2;

FIG. 4 illustrates the angular deviation of a ramp;

Figure 5:
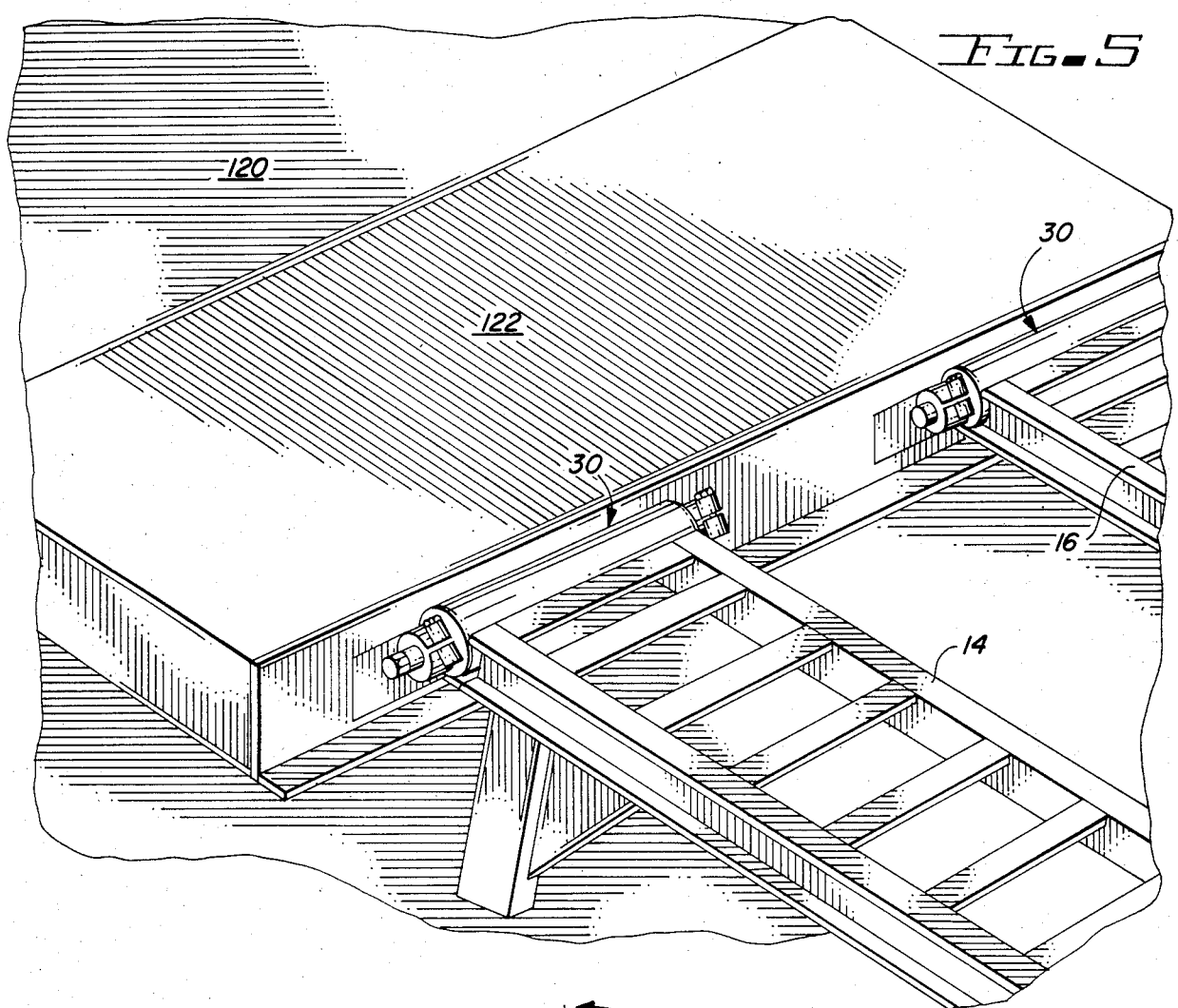
FIG. 5 illustrates ramps attached to the end of a beaver tail trailer.

Referring jointly to FIGS. 1 and 4, there is shown a conventional trailer 10 for transporting heavy wheeled vehicles to and from a work site. To load and unload the vehicles, a pair of ramps 12, 14 are pivotally secured to end 16 of the trailer. The spacing between the ramps is commensurate with the tracks of the vehicles to be trailered. Generally, ramp support legs 18, 20 extend from the lower surface of the respective ramps for the purpose of equalizing and supporting the assymetric loads imposed upon the trailer during loading and unloading.

For trailers not having a source of hydraulic or electric power to energize actuators for pivotally repositioning ramps 12, 14, an operator must manually relocate each ramp between the upright, at rest, position to a position below horizontal to place the end of the ramp upon the ground. Because these ramps are relatively long to provide a small inclined angle and because the ramps must support substantial loads, the ramps are robust and heavy. The resulting physical demands made upon the operator are known to sometimes over stress and cause injury to the operator's muscles and various joints. This source for such injuries is sought to be avoided by the spring assist mechanism described hereinafter.

Referring jointly to FIGS. 1, 2 and 3, spring assist mechanism 30 will be described in detail. A pair of mounting tabs 32, 34 are welded or otherwise attached to a C-channel 36, or the like, at end 16 of trailer 10. Mounting tab 32 includes a locking collar 38 having a bolt 40 cooperating with a threaded receiver 42 for purposes of tightening and loosening the locking collar. Mounting tab 34 includes a similar locking collar 44, bolt 46 and threaded receiver 48. A shaft 50 is located within and lockable with locking collars 38, 44. For reasons which will be discussed below, one end of the shaft includes a nut 52 located in axial alignment therewith. For conventional flat bed trailers, such as that illustrated in FIG. 4, it is preferable that the top of spring assist mechanism 30 be generally coincident with an imaginary line extending from the top of end 16 to the top of the attached end of the ramp (12, 14) to minimize rolling resistance thereacross of the equipment being loaded and unloaded.

A coil spring 60 is concentrically located about shaft 50 intermediate mounting tabs 32, 34 and is enshrouded within a cylinder 66. Opposed ends 62, 64 of the coil spring extend axially in opposed directions. An annular bearing 68 is mounted upon shaft 50 and includes a cavity 70 for receiving end 62. The peripheral surface of bearing 68 is located within radially expanded recess 72 within cylinder 66 and adjacent shoulder 74 of the recess. A retaining ring 76 is located within groove 78 in the recess to maintain annular bearing 68 within the recess and generally adjacent shoulder 74. Shaft 50 is secured to the annular bearing by spot welds or annular weld 80 to preclude independent rotational movement between the bearing and the shaft. A grease fitting 82 extends through the wall of cylinder 66 approximately coincident with annular channel 84 formed in the peripheral surface of annular bearing 68 adjacent to and in contact with the cylindrical surface of recess 72. Thereby, the friction due to rotational displacement between the cylinder and the bearing is minimized.

A further annular bearing 88 is located upon shaft 50 and includes a cavity 90 for receiving end 64 of the coil spring. A radially expanded recess 92 within cylinder 66 is employed to locate bearing 88 therein and adjacent shoulder 94 of the recess. Bearing 88 is rigidly secured to cylinder 66 through spot welds or annular weld 96. A grease fitting 98 is located in cylinder 66 generally coincident with passageway 100 extending through the bearing and channel 102 within the interior cylindrical surface of bearing 88. Thereby, the friction resulting from independent rotational movement between shaft 50 and bearing 88 is reduced.

As particularly shown in FIGS. 1 and 2, ramp 14 is attached by welds or otherwise to cylinder 66 through a C-channel 110; alternatively, the two side walls of the C-channel may be simple extensions of the top and bottom surface of the ramp.

Figure 8:
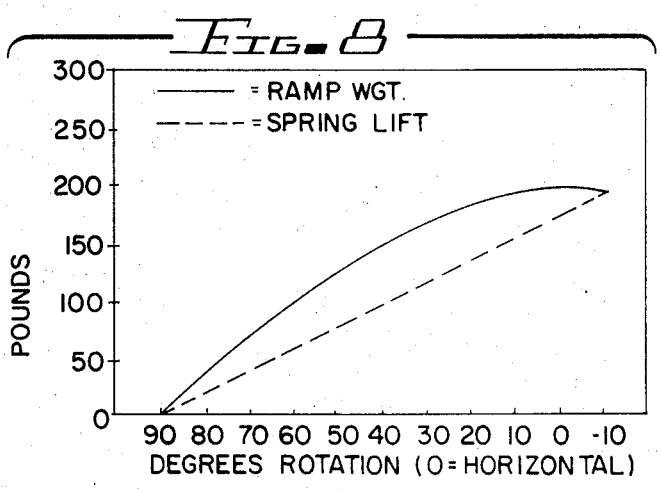
FIG. 8 is a graph illustrating the reduced apparent weight of the ramps through use of the present invention.

As illustrated by the graph depicted in FIG. 8, the apparent weight of a ramp is a function of the rotational position of the ramp with respect to vertical. That is, the ramp has essentially no apparent weight when it extends vertically upright from the pivot axis, as illustrated by dashed line 110 in FIG. 4. Thus, at this position, an operator can easily hold the ramp in place with little effort and no spring assist mechanism is needed to alleviate or reduce any loads imposed by the ramp. Therefore, initial adjustment of spring assist mechanism 30 may be made when the ramp extends vertically upright. Such adjustment is effected by tightening bolts 40 and 46 to lock shaft 50 within respective locking collars 38 and 44. Any subsequent movement of the ramp to the right, as shown in FIG. 4, will tend to cause coil spring 60 to be tightened by action of end 64 being rotated about shaft 50 due to rotation of cylinder 66 attached to the ramp and bearing 88 rigidly interconnecting the cylinder with the coil spring end. The coil spring will resist such rotation as depicted by the graph in FIG. 8. It may be noted that the resistance is essentially a straight line function of the angle through which the ramp is rotated. The resisting force presented by the coil spring will tend to negate or partially compensate for the increase in force exerted by the ramp as the angle off vertical increases. The apparent weight of the ramp actually experienced by an operator is represented by the graph in FIG. 8 by the vertical distance between the dashed line and the solid line for any given angle. Accordingly, the loads which an operator must counteract when pivoting the ramp are substantially reduced, resulting in a substantial reduction of the possibility of injury to the operator.

Normally, during transport of trailer 10 (see FIG. 4), the ramp is locked with a locking bar (not shown) at a point slightly forward of vertical line 110; the angle is nominally ten degrees (10°). From the above discussion of the initial neutral point of coil spring 60, forward pivotal movement of the ramp therefrom to its position during travel will tend to untwist the coil spring. The coil spring will resist such untwisting and thereby create a force to resist forward pivotal movement of the ramp and counteract or reduce the resulting apparent weight of the ramp.

For most applications, the total angle through which a ramp is rotated when used in conjunction with a flat bed trailer is one hundred ten degrees (110°). That is, the ramp is of a length sufficient to permit rotation beyond horizontal to an incline of approximately ten degrees (10°) and the position of the ramp at rest during transport is approximately ten degrees (10°) forward of vertical.

Figure 6:
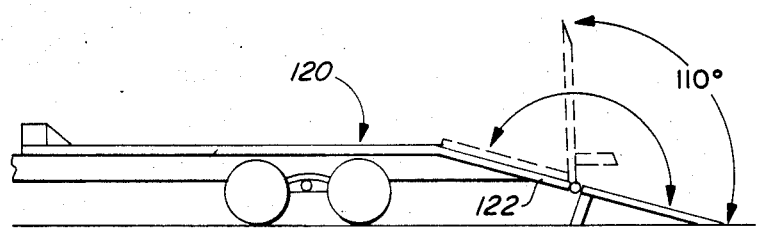
FIG. 6 illustrates the angles through which the ramp shown in FIG. 5 may be rotated.

For certain equipment to be transported, a trailer known as a beaver tail trailer 120 is employed, as illustrated in FIG. 6. Such trailers have a sloping rear end 122. Additionally, ramps 14, 16 employed therewith are dimensioned in length to be essentially planar extensions of the slope of end 122 when rotated to the position of use, as illustrated in FIG. 6. During transport of trailer 120, the ramps are generally rotated upwardly and forwardly to lie against and be supported by end 122. Thereby, the angular rotation of the ramps is approximately one hundred eighty degrees (180°). As discussed above, when the ramps are in the upright position, essentially very little effort is required by an operator to maintain a ramp in this position but substantial effort is required to raise each ramp off end 122 to the upright position and to lower it to the position of use. Similarly, substantial effort is required to reposition the ramp off the ground from the position of us to the position of rest.

Spring assist mechanism 30 will provide a reduction in the apparent weight of the ramp, whether the ramp is rotated forwardly or rearwardly of its vertical position. When rotated rearwardly, the coil spring will resist such movement due to the resulting further coiling of the coil spring. When a ramp is rotated forwardly, there will occur an uncoiling of the coil spring which also will have the effect of counteracting some, if not all of the increasing force exerted by the ramp. Thus, the apparent weight of the ramp to the operator can be reduced significantly.

Figure 7:
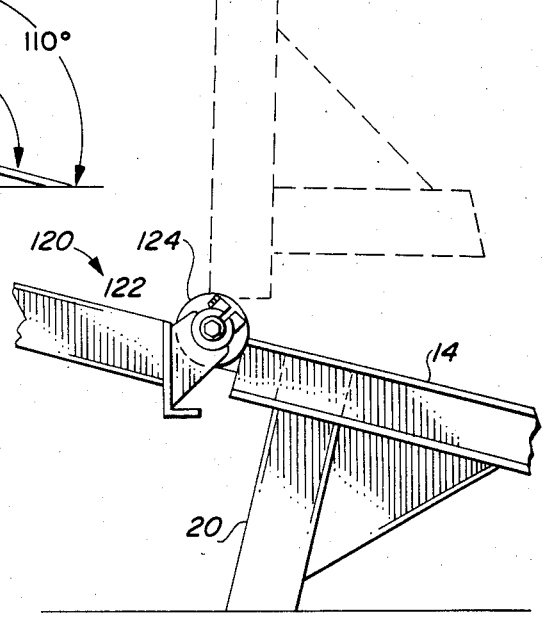
FIG. 7 is a partial view illustrating the pivot between the ramps and trailer shown in FIG. 5.

As particularly noted in FIG. 7, the location of the spring assist mechanism must be higher with respect to the rear end 124 of trailer 120 than for that of trailer 10 to permit ramp 14 to lie upon and in parallel relationship with end 122.

For special purposes or for other considerations it may be preferable to have the neutral point for coil spring 60 at a position other than the upright vertical position 110 (see FIG. 4). The neutral point can be readily varied by preloading or unloading coil spring 60 with respect to any given location of the attached ramp. Such change in the rotational neutral point of the coil spring may be effected as follows. By partially unscrewing bolts 40, 46, collars 38, 44 are loosened to permit shaft 50 to rotate therein. By maintaining ramp 14 positionally fixed, end 64 of coil spring 60 also becomes positionally fixed. By rotating nut 52 with the help of a wrench or the like, end 62 of coil spring may be rotated about the axis of the coil spring through rotation of shaft 50 to coil or uncoil the coil spring. Once the desired degree of preloading or unloading is achieved, bolts 40 and 46 are tightened to lock shaft 50 in its new position within locking collars 38 and 44.

While the principles of the invention have now been made clear in an illustrative embodiment, there will be immediately obvious to those skilled in the art many modifications of structure, arrangement, proportions, elements, materials, and components, used in the practice of the invention which are particularly adapted for specific environments and operating requirements without departing from those principles.

I claim:

1. A spring assist mechanism for assisting pivotal movement intermediate two elements, such as a ramp extending from a trailer, said mechanism comprising in combination:

(a) a coil spring having opposed ends for exerting a material force to assist pivotal movement of the ramp relative to the trailer;
   (b) a shaft located internally concentric with said coil spring for translating a force exerted by said coil spring to the trailer;
   (c) a shroud enveloping said coil spring for translating a force exerted by said coil spring to the ramp;
   (d) means for securing one end of said coil spring to said shaft; and
   (e) further means for securing the other end of said coil spring to said shroud, said further securing means comprising a further annular bearing in penetrable engagement with said shaft and disposed within said shroud and further means for fixedly attaching said further annular bearing to said shroud;

whereby, the degree of assisting force produced by said mechanism is a function of the relative pivotal relationship between the ramp and the trailer.

2. The mechanism as set forth in claim 1 wherein said securing means comprises an annular bearing in penetrable engagement with said shaft and disposed within said shroud and means for fixedly attaching said annular bearing to said shaft.

3. The mechanism as set forth in claim 2 including means for lubricating said annular bearing and said further annular bearing.

4. The mechanism as set forth in claim 2 including tab means for retaining opposed ends of said shaft, said tab means being securable to the trailer.

5. The mechanism as set forth in claim 4 including weld means for attaching said shroud to the ramp.

6. The mechanism as set forth in claim 1 including means for pre-loading said coil spring.

* * * * *